May 19, 1953  M. N. FAIRBANK  2,638,825
CAMERA SHUTTER MECHANISM
Filed Nov. 24, 1950

INVENTOR
Murry N. Fairbank
BY
Donald C. Brown
ATTORNEY

Patented May 19, 1953

2,638,825

UNITED STATES PATENT OFFICE 2,638,825

CAMERA SHUTTER MECHANISM

Murry N. Fairbank, Belmont, Mass., assignor to Polaroid Corporation, Cambridge, Mass., a corporation of Delaware Application November 24, 1950, Serial No. 197,246

10 Claims. (Cl. 95—59)

This invention relates to photographic devices and more particularly to shutter mechanisms for cameras.

In the copending joint application of Sidney B. Whittier and myself, Serial No. 727,002, filed February 7, 1947, for Camera Shutter Mechanism, now Patent No. 2,531,936, issued November 28, 1950, there is shown a novel shutter structure which comprises an aperture-covering element or blade mounted for substantially free and frictionless rotation and normally held by suitable holding means in stationary aperture-covering position. The structure includes suitable means for applying a sharp impact to the closure element to rapidly move the same so as to disengage it from its holding means and so as to uncover the exposure aperture. There is provided in the path of movement of the closure element suitable rebound means for engaging a portion of said element for the purpose of reversing the direction of rotation of said element. The engaging portions of the rebound member and the closure element are preferably elastic and include, for example, a metallic spring, whereupon the reversal of the closure element by the rebound member is accomplished without any substantial loss of the energy content of the closure element. One of the significant structural features of this arrangement, as pointed out in said copending application, is the mounting of the closure element for relatively free rotation and the construction of the impact-applying means and the rebound member so that the closure element is only in engagement with these parts of the structure for a small portion of the total travel thereof. As a result of this arrangement, the remainder of the travel of the closure element is substantially free and at a substantially constant velocity, whereby it is possible to much more readily and more accurately control the timing of the shutter mechanism.

It is one object of the present invention to provide an improved modification of the foregoing type of shutter structure wherein the shutter timing is also controlled by a free moving timing member but wherein said timing member is physically distinct from the shutter closure element, being so related thereto as to move said closure element out of and into aperture-covering position during its reciprocal motion.

Another object is to provide a shutter structure of this novel construction which embodies as aperture-closing means a plurality of blades or closure elements and which is especially adapted for use in camera apparatus having lenses which require exposure apertures of large diameter.

Other objects of the invention will in part be obvious and will in part appear hereinafter.

The invention accordingly comprises the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed description, taken in connection with the accompanying drawing, wherein.

Figure 1:
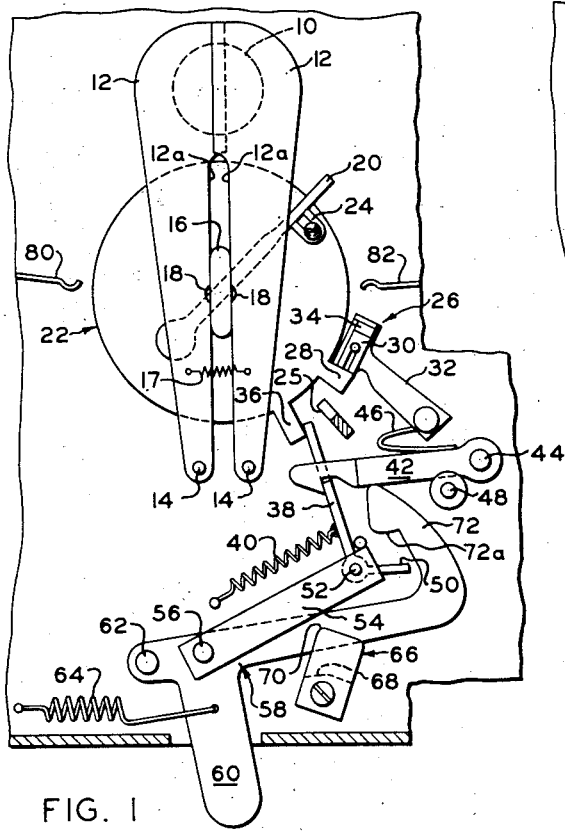
Figure 1 is a somewhat diagrammatic top plan view, with parts broken away, of one embodiment of the shutter mechanism of the present invention, the latter being shown equipped with a plurality of closure elements and in aperture-covering position.

In accordance with the present invention, there is provided a novel shutter structure comprising as elements thereof an aperture-covering means consisting of one or more blades and a timing flywheel whose movement controls the operation of said aperture-covering means. The timing flywheel is mounted for relatively free movement and is normally held in a predetermined stationary position by suitable holding means, being rendered operative by an impulse-applying means which is effected to disengage it from said holding means and to impart rotary motion thereto. The flywheel thus energized remains in contact with the impulse-applying means, for only a brief portion of its initial angular displacement and thereafter rotates free of said impulse-applying means, during which further rotation it moves the aperture-closing means to open position. It is intercepted in its travel by a rebound member which reverses the direction of its rotation whereupon it is returned to its initial stationary position and in its return travel moves the aperture-covering means back to closed position. The rebound member and the portion of the flywheel which engages said rebound member are formed of elastic materials so that the rebound member reverses the direction of rotation of the flywheel without any appreciable loss in the energy content of the latter. In operation, the rebound member and the impact-applying means engage the timing flywheel for only a short portion of the total travel thereof, the remainder of the travel of said flywheel being at a substantially constant velocity. As a result, it becomes readily possible to closely and accurately control the total time of movement of said flywheel and, since the operation of the aperture closure element and the shutter mechanism is controlled by this timing flywheel, the shutter speed is thus subject to an equally accurate control. The shutter mechanism can also be readily provided with means for varying the exposure time, as for example:

(a) By having an impulse-applying means whose energy output is adjustable so that different angular velocities can be imparted to the timing flywheel;

(b) By providing a rebound member whose position, with respect to the arcuate travel of that portion of the timing flywheel which it is adapted to engage, can be so adjusted that the total angular displacement of the flywheel can be correspondingly varied; and/or (c) By providing a plurality of rebound members differently located along the arcuate path of travel of the portion of the timing flywheel which is to be engaged by said members and by so mounting said rebound members that different ones thereof can be positioned to intercept the timing flywheel during its travel, and, since each is differently positioned with respect to the path of travel of said timing flywheel, each will give a different effective total displacement time for said flywheel.

It is to be understood that the term "blade" is herein used in a generic sense to cover any type of shutter closure element which is operative, either alone or together with other elements, to effect the closure of an exposure aperture of a camera, and that the term "flywheel" is also intended to be generic in scope and to include solid discs, counterbalanced arms, etc.

Referring now to Fig. 1, there is shown, by way of example, one form of shutter mechanism comprehended by the present invention which, as shown, comprises an exposure aperture 10 and a pair of shutter blades 12 which are mounted for pivotal movement upon a pair of pivots 14 located adjacent the ends of said blades farthest removed from said aperture. The aperture-covering portion of each blade is enlarged while the remainder thereof is somewhat narrower and elongated so that with said enlarged portions overlapping one another in aperture-covering position, as shown in Fig. 1, there is a space between the adjacent edges 12a of the narrower portions of the blades sufficiently wide to receive between them the width of an elongated cam 16. Suitable resilient means are provided, for example, in the form of a coil spring 17 for connecting together the two blades and for normally lightly biasing the same into their aperture-covering position wherein edges 12a of the blades are in engagement with the flat elongated surfaces of cam 16. Each of edges 12a also has a cam-engaging indentation 18 formed therein, each said indentation being located substantially opposite the center of said cam.

Figure 2:
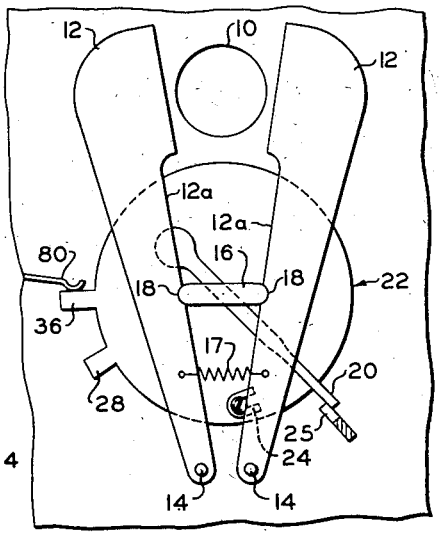
Fig. 2 is a similar view of a portion of the shutter mechanism of Fig. 1 showing the shutter structure in aperture-uncovering position.

In order to actuate cam 16 so that it can rotate and pivot blades 12 into their aperture-uncovering position, as shown in Fig. 2, an arm 20 is rigidly secured to said cam and is rotatably mounted about an axis which coincides substantially with the center of cam 16 and which is substantially perpendicular to the plane of blades 12. As shown, arm 20 is counterbalanced with respect to its center of rotation.

In order to angularly displace arm 20 sufficiently to move shutter blades 12 into open, i. e., aperture-uncovering, position (Fig. 2) and to accurately control the total time during which said blades remain in said open position, there is provided a novel timing flywheel 22 which is mounted for relatively free rotary movement about an axis of rotation that is substantially coincident with the axis of rotation of said arm 20. Flywheel 22 is detachably secured to arm 20, being connected thereto only by a magnet 24. To control the extent of angular displacement imparted to arm 20 by the rotation of flywheel 22, a stop 25 is provided and depends from the shutter housing so as to intercept arm 20 as it travels past with said flywheel. Stop 25 is so located as not to obstruct, or otherwise interfere with the motion of, flywheel 22, being preferably positioned with its lower edge above the plane of the upper surface of said flywheel. When arm 20 engages said stop, cam 16 has rotated sufficiently to have its ends enter indentations 18, i. e., to be in the position shown in Fig. 2. In this position, the bias of spring 17 is sufficiently overcome by the engagement between the ends of cam 16 and indentations 18 to prevent the shutter blades from being returned to aperture-closing position. Thus, the shutter blades are maintained in their open position so long as flywheel 22 remains disengaged from arm 20. The engagement of arm 20 and stop 25 which is effective to disengage magnet 24 is accomplished at a constant breakaway force whereby the change in flywheel velocity, due to the breakaway, will be substantially constant. The flywheel continues its angular motion until reversed by suitable rebound means to be more fully described hereinafter. It will be evident that magnet 24 will, during the return travel of said flywheel, reengage arm 20 and kick said arm back in the direction of its normal position shown in Fig. 1, whereupon cam 16 is disengaged from indentations 18 and blades 12 are also returned to their aperture-covering position.

To operate flywheel 22, there is preferably provided a suitable means for holding the same in its normally stationary position, an impulse-applying means for energizing the flywheel to actuate the shutter and a reversing means comprising one or more rebound members for returning the flywheel to said holding means after energization thereof, and these several means may be of the same general construction as the corresponding means for operating the shutter blade of the shutter mechanism of the aforementioned copending application Serial No. 727,002.

In this form of structure, the flywheel 22 is preferably held in its stationary position (Fig. 1) by a holding means 26 which is adapted to engage a lug 28 radially extending from said flywheel. Lug 28 may be of a magnetic material or may have a material attached thereto which is magnetic, and holding means 26 comprises a horseshoe-type magnet 30 for engaging said lug 28 and for applying a magnetic holding force thereto. A mounting member 32 of nonmagnetic material slidably mounts magnet 30 so that a vibration-absorbing or dampening member 34, positioned between the end of said magnet and a portion of mounting means 32, may act to absorb the impact of lug 28 as the latter strikes said holding means at the end of its return movement.

The flywheel 22 is actuated by having a radially extending arm 36, which is integrally formed therewith or otherwise rigidly secured thereto, kicked by an impulse-applying member 38 of a self-cocking impulse-applying means of the type shown in said copending application. In said means, impulse-applying member 38 is biased for counterclockwise rotation by a spring 40. A shoulder or other suitably formed portion of member 38 is provided for engagement with a latch 42, said latch having a notched portion for engaging said member 38 and being pivotally mounted at 44. Latch 42 is normally biased into engagement with member 38 by a suitable resilient means, such as blade spring 46, counterclockwise rotation of latch 42, as viewed in Fig. 1, due to the bias of spring 46, being limited by a stop 48. Impulse-applying member 38 is preferably a bell crank lever and comprises an arm 50 and is pivotally mounted at 52 upon a plate 54, the latter in turn being connected by a pivot 56 to a trigger 58 which has a portion 60 thereof extending exteriorly of the shutter housing. Portion 60 may be manually operated to actuate the shutter by being moved from left to right, as viewed in Fig. 1, i. e., counterclockwise. Trigger 58 is pivotally mounted at 62 and is biased by a spring 64 in a clockwise direction with respect to said pivot 62. A suitable stop 66, carried by the shutter housing, has a surface 68 thereof for engaging trigger 58, thereby limiting the clockwise movement of the latter, and also has a surface 70 so located as to engage plate 54 to limit the clockwise movement of the latter along with trigger 58 or about pivot 56. Trigger 58 also comprises an angularly extending arm portion 72 which, upon counterclockwise movement of trigger 58, so engages latch 42 as to move the latter out of engagement with impulse-applying member 38, whereupon the latter actuates timing flywheel 22 through arm 36. It will be noted that counterclockwise rotation of trigger 58 is effected against the bias of spring 64 so that trigger 58 will be normally returned by the bias of said spring to its original position and, in so doing, surface 72a of the angular extension of said trigger will engage arm 50 of the bell crank impulse member 38 and will cock said impulse member 38 by causing the latter to operatively engage again with latch 42. It will be noted that the cocking of said impulse member 38 will be aided by the engagement of plate 54 with surface 70 of stop 66.

To reverse the direction of rotation of flywheel 22, means are provided for engaging arm 36 at any one of a plurality of predetermined points in the angular displacement thereof. In the form shown, said means comprise a pair of rebound springs 80 and 82. Spring 80 is shown in position to engage arm 36 of the flywheel and is preferably pivotally or otherwise movably mounted, so that it can be moved out of its arm-engaging position, whereupon flywheel 22 is free to rotate until it reaches spring 82. This makes it possible, by a suitable manual adjustment of the position of spring 80, to obtain two different shutter speeds. Additional movably mounted springs can be provided and interposed along the paths of travel of arm 36 of the flywheel so that a plurality of shutter speeds in excess of two can be had if desired. Alternatively, or together with the foregoing arrangement, it is possible to provide means for varying the tension of spring 40 of the impulse-applying or "kicker" mechanism to vary the energy output of member 38. This can readily be accomplished, for example, by having the member which secures spring 40 to the shutter housing so mounted and constructed that its position, with respect to said housing, can be adjusted. Variation in the tension of spring 40 has the effect of varying the velocity at which flywheel 22 moves, whereas adjustment of spring 80 varies the total displacement of the flywheel.

Figure 3:
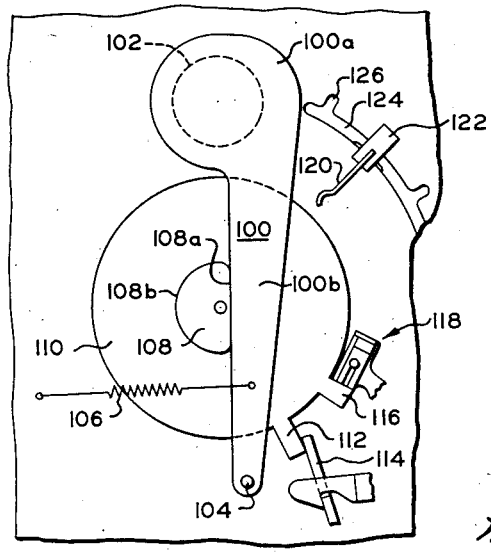
Fig. 3 is a similar view of another modification of the shutter structure wherein a single closure element or blade effects the closure of the exposure aperture.

Referring now to Fig. 3, there is shown a novel modification of the foregoing structure wherein a single blade 100 is used to effect the closure of the exposure aperture 102. As shown, shutter blade 100 comprises an enlarged aperture-closing portion 100a and a somewhat narrow elongated stem 100b, the latter being pivotally mounted at the end thereof remote from said enlarged portion. A pivot 104 provided adjacent the end of said stem portion 100b mounts the shutter blade for pivotal movement. A light coil spring 106 fixed at one end to said stem portion 100b and at the other end to the shutter housing lightly biases shutter blade 100 into aperture-closing position and also serves to maintain said stem portion in engagement with a cam 108. Cam 108 is fixedly mounted on a timing flywheel 110 which is similar in function and structure to the flywheel of embodiments of Figs. 1 and 2 and comprises an arm 112 which is adapted to be engaged by a suitable impulse-applying member 114 and a lug 116 which is adapted to be held stationary by a suitable holding means 118. These are similar to and are rendered operative by mechanisms similar to those shown in the embodiments of Figs. 1 and 2.

The travel of the timing flywheel 110 is reversed by means of a rebound spring 120 which functions for the same purpose and in the same manner as rebound springs 80 and 82 of the embodiment of Figs. 1 and 2. In the present embodiment, however, the single rebound spring 120 is employed to give a plurality of shutter speeds, being differently positioned in the path of travel of the arm 112 in order to effect a variation in the total displacement of timing flywheel 110. As shown, rebound spring 120 is mounted on a suitable support 122 which is in turn slidably mounted in a slot 124 provided with suitable indentations 126 which fix the position of support 122 by cooperating with a suitable releasable detent (not shown) mounted on said support. Cam 108 is so constructed that normally a flat surface portion 108a thereof is in engagement with the stem portion of shutter blade 100. Cam 108 rotates together with timing flywheel 110 to pivot shutter blade 100 in a clockwise direction, as viewed in Fig. 3, until the arcuate surface 108b engages the stem of the shutter blade. Surface 108b is preferably concentric with the axis of rotation of flywheel 110 so that once said surface fully engages the stem portion 100b, no further pivotal movement of said stem portion takes place. When this engagement is achieved, aperture 102 is completely uncovered. Upon reversal of the direction of rotation of flywheel 110, cam 108 is brought back into its initial position with surface 108a thereof in engagement with the shutter blade 100, permitting the return of the latter in response to the bias of spring 106 to its aperture-closing position.

It is to be observed, in connection with the above-noted embodiments of the invention, that the impact-applying member which engages the arm mounted on the flywheel is in contact with the flywheel for only a short portion of the total displacement thereof and that similarly the rebound member, which reserves the direction of movement of the flywheel, also engages the latter for only a very short portion of the total travel. It is to be further noted that although applicant has not specifically illustrated any mechanisms for cooperating with the rebound springs for holding the shutter in its open position, it is now apparent that any suitable means, such, for example, as the type of arrangement shown in the aforesaid copending application Serial No. 727,002, may be used for effecting a "bulb exposure." Suitable electrical contacts may also be embodied within the shutter housing and actuated during the operation of the foregoing mechanisms for completing a circuit to a photoflash lamp.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. In a shutter for a photographic device, means providing an exposure aperture, means including at least one blade for covering said aperture, means for mounting said blade for movement into and out of aperture-covering position, a timing flywheel, means for mounting said flywheel for rotation, said last-named means being spaced from the said mounting means for said blade so that said flywheel and said blade have essentially different paths of movement, means normally holding said flywheel in stationary position, means for applying a sharp impulse to said flywheel to free the same of said holding means and to impart rotary motion thereto, reversing means for reversing the direction of rotation of said flywheel, said reversing means including a rebound member and mechanism for positioning said rebound member in the path of movement of said flywheel to cause said member to engage said flywheel, the engaging parts of said rebound member and said flywheel being so constituted as to effect the reversal of motion of said flywheel without any substantial diminution in the energy content of said flywheel, said rebound member and said impulse-applying means engaging said flywheel for only a small portion of the total travel thereof, said holding means reengaging and holding said flywheel upon the return thereof to its normally stationary position, and means for connecting said flywheel to said blade so that said flywheel, during rotation from its initial stationary position, moves said blade out of its aperture-covering position, said connecting means being so constituted that said blade returns to its aperture-covering position when said flywheel returns to its initial stationary position, said connecting means comprising a cam member mounted on said timing flywheel for at least partial rotation therewith and means biasing said shutter blade into operative engagement with said cam member.

2. In a shutter for a photographic device, means providing an exposure aperture, means including a plurality of blades for covering said aperture, means for mounting said blades for pivotal movement into and out of aperture-covering position, a timing flywheel, means for mounting said flywheel for rotation, said last-named means being spaced from the said mounting means for said blades so that said blades and said flywheel have essentially different paths of movement, means normally holding said flywheel in a stationary position, means for applying a sharp impulse to said flywheel to free the same of said holding means and to impart rotary motion thereto, reversing means for reversing the direction of rotation of said flywheel, said reversing means including a rebound member and a mechanism for positioning said rebound member in the path of movement of said flywheel to cause said member to engage said flywheel, the engaging parts of said rebound member and said flywheel being so constituted as to effect the reversal of motion of said flywheel without any substantial diminution in the energy content of said flywheel, said rebound member and said impulse-applying means engaging said flywheel for only a small portion of the total travel thereof, said holding means reengaging and holding said flywheel upon the return thereof to its normally stationary position, and means for connecting said flywheel to said blades so that said flywheel, during rotation from its initial stationary position, moves said blades out of their aperture-covering position, said connecting means being so constituted that said blades return to their aperture-covering position when said flywheel returns to its initial stationary position, said connecting means comprising a cam member mounted on said timing flywheel for at least partial rotation therewith and resilient means for biasing said blades into engagement with said cam member, said cam member being located between said blades and engaging each said blade between the pivotal mounting and the aperture-covering section of said blade.

3. In a shutter for a photographic device, means providing an exposure aperture, means including at least one blade for covering said aperture, means for mounting said blade for movement into and out of aperture-covering position, a timing flywheel, means for mounting said flywheel for rotation, said last-named means being spaced from the said mounting means for said blade so that said flywheel and said blade have essentially different paths of movement, means normally holding said flywheel in stationary position, means for applying a sharp impulse to said flywheel to free the same of said holding means and to impart rotary motion thereto, reversing means for reversing the direction of rotation of said flywheel, said reversing means including a plurality of rebound members differently positioned along the path of travel of the portion of said flywheel adapted to be engaged thereby and mechanism for controlling the position of said rebound members so that any selected one of said members can be caused to engage and reverse the direction of movement of said flywheel, the engaging parts of each said rebound member and said flywheel being so constituted as to effect the reversal of motion of said flywheel without any substantial diminution in the energy content of said flywheel, each said rebound member and said impulse-applying means engaging said flywheel for only a small portion of the total travel thereof, said holding means reengaging and holding said flywheel upon the return thereof to its normally stationary position, and means for connecting said flywheel to said blade so that said flywheel, during rotation from its initial stationary position, moves said blade out of its aperture-covering position, said connecting means being so constituted that said blade returns to its aperture-covering position when said flywheel returns to its initial stationary position, said connecting means comprising a cam member mounted on said timing flywheel for at least partial rotation therewith about the same axis as said flywheel and means biasing said shutter blade into an engagement with said cam.

4. In a shutter for a photographic device, means providing an exposure aperture, means including at least one blade for covering said aperture, means for mounting said blade for pivotal movement into and out of aperture-covering position, a timing flywheel, means for mounting said flywheel for rotation, said last-named means being spaced from the said mounting means for said blade so that said flywheel and said blade have essentially different paths of movement, means normally holding said flywheel in stationary position, means for applying a sharp impulse to said flywheel to free the same of said holding means and to impart rotary motion thereto, reversing means for reversing the direction of rotation of said flywheel, said reversing means including a rebound member and mechanism for movably mounting said rebound member, said mechanism being operative to locate said rebound member in any one of a plurality of positions arcuately spaced along the path of movement of said flywheel, the engaging parts of said rebound member and said flywheel being so constituted as to effect the reversal of motion of said flywheel without any substantial diminution in the energy content of said flywheel, said rebound member and said impulse-applying means engaging said flywheel for only a small portion of the total travel thereof, said holding means reengaging and holding said flywheel upon the return thereof to its normally stationary position, and means for connecting said flywheel to said blade so that said flywheel, during rotation from its initial stationary position, moves said blade out of its aperture-covering position, said connecting means being so constituted that said blade returns to its aperture-covering position when said flywheel returns to its initial stationary position, said connecting means comprising a cam member rigidly secured to said timing flywheel for rotation about the same axis as said flywheel and resilient means biasing said blade into engagement with said cam member, said cam member engaging said blade intermediate the pivotal mounting and the aperture-covering section of said blade.

5. In a shutter for a photographic device, means providing an exposure aperture, means including at least one movable blade for covering said aperture, a timing flywheel, means for mounting said flywheel for rotation, means normally holding said flywheel in stationary position, means for applying a sharp impulse to said flywheel to free the same of said holding means and to impart rotary motion thereto, reversing means for reversing the direction of rotation of said flywheel, said reversing means including a rebound member and mechanism for positioning said rebound member in the path of movement of said flywheel to cause said member to engage said flywheel, the engaging parts of said rebound member and said flywheel being so constituted as to effect the reversal of motion of said flywheel without any substantial diminution in the energy content of said flywheel, said rebound member and said impulse-applying means engaging said flywheel for only a small portion of the total travel thereof, said holding means reengaging and holding said flywheel upon the return thereof to its normally stationary position, and means for connecting said flywheel to said blade so that said flywheel, during rotation from its initial stationary position, moves said blade out of its aperture-covering position, said connecting means being so constituted that said blade returns to its aperture-covering position when said flywheel returns to its initial stationary position, said connecting means comprising a cam for engaging and moving said blade, a member upon which said cam is mounted, means for detachably securing said last-named member to said flywheel and means for effecting the detachment of said last-named member and said flywheel when said blade has been moved by said cam to its fully open position, said blade remaining in this open position until said last-named member is reengaged by said flywheel during the return movement of the latter.

6. In a shutter for a photographic device, means providing an exposure aperture, means including at least one movable blade for covering said aperture, resilient means normally biasing said blade into its aperture-covering position, a timing flywheel, means for mounting said flywheel for rotation, means normally holding said flywheel in stationary position, means for applying a sharp impulse to said flywheel to free the same of said holding means and to impart rotary motion thereto, reversing means for reversing the direction of rotation of said flywheel, said reversing means including a rebound member and mechanism for positioning said rebound member in the path of movement of said flywheel to cause said member to engage said flywheel, the engaging parts of said rebound member and said flywheel being so constituted as to effect the reversal of motion of said flywheel without any substantial diminution in the energy content of said flywheel, said rebound member and said impulse-applying means engaging said flywheel for only a small portion of the total travel thereof, said holding means reengaging and holding said flywheel upon the return thereof to its normally stationary position, and means for connecting said flywheel to said blade so that said flywheel, during rotation from its initial stationary position, moves said blade out of its aperture-covering position, said connecting means being so constituted that said blade returns to its aperture-covering position when said flywheel returns to its initial stationary position, said connecting means comprising a cam for engaging and moving said blade, a member mounting said cam for rotary movement about an axis substantially concentric with the axis of rotation of said flywheel, means for detachably securing said last-named member to said flywheel and means for effecting the detachment of said last-named member and said flywheel when said blade has been moved by said cam to its fully open position, said cam and said blade cooperating with one another in said last-named position to hold said blade stationary against the bias of said resilient means until said last-named member is reengaged by said flywheel during the return movement of the latter.

7. In a shutter for a photographic device, means providing an exposure aperture, means including at least one movable blade for covering said aperture, resilient means normally biasing said blade into its aperture-covering position, a timing flywheel, means for mounting said flywheel for rotation, means normally holding said flywheel in stationary position, means for applying a sharp impulse to said flywheel to free the same of said holding means and to impart rotary motion thereto, reversing means for reversing the direction of rotation of said flywheel, said reversing means including a rebound member and mechanism for positioning said rebound member in the path of movement of said flywheel to cause said member to engage said flywheel, the engaging parts of said rebound member and said flywheel being so constituted as to effect the reversal of motion of said flywheel without any substantial diminution in the energy content of said flywheel, said rebound member and said impulse-applying means engaging said flywheel for only a small portion of the total travel thereof, said holding means reengaging and holding said flywheel upon the return thereof to its normally stationary position, and means for connecting said flywheel to said blade so that said flywheel, during rotation from its initial stationary position, moves said blade out of its aperture-covering position, said connecting means being so constituted that said blade returns to its aperture-covering position when said flywheel returns to its initial stationary position, said connecting means comprising a cam for engaging and moving said blade, a member mounting said cam for rotary movement about an axis substantially concentric with the axis of rotation of said flywheel, means for detachably securing said last-named member to said flywheel and means for effecting the detachment of said last-named member and said flywheel when said blade has been moved by said cam to its fully open position, said cam and said blade cooperating with one another in said last-named position to hold said blade stationary against the bias of said resilient means until said last-named member is reengaged by said flywheel during the return movement of the latter, said cam being elongated and the end of said cam being adapted to engage an indentation in said blade to hold the latter stationary in said fully open position.

8. In a shutter for a photographic device, means providing an exposure aperture, means including a plurality of movable blades for covering said aperture, a timing flywheel, means for mounting said flywheel for rotation, means normally holding said flywheel in a stationary position, means for applying a sharp impulse to said flywheel to free the same of said holding means and to impart rotary motion thereto, reversing means for reversing the direction of rotation of said flywheel, said reversing means including a rebound member and a mechanism for positioning said rebound member in the path of movement of said flywheel to cause said member to engage said flywheel, the engaging parts of said rebound member and said flywheel being so constituted as to effect the reversal of motion of said flywheel without any substantial diminution in the energy content of said flywheel, said rebound member and said impulse-applying means engaging said flywheel for only a small portion of the total travel thereof, said holding means reengaging and holding said flywheel upon the return thereof to its normally stationary position, and means for connecting said flywheel to said blades so that said flywheel, during rotation from its initial stationary position, moves said blades out of their aperture-covering position, said connecting means being so constituted that said blades return to their aperture-covering position when said flywheel returns to its initial stationary position, said connecting means comprising a cam for engaging and moving said blades, a member upon which said cam is mounted, means for detachably securing said last-named member to said flywheel and means for effecting the detachment of said last-named member and said flywheel when said blades have been moved by said cam to their fully open position, said blades remaining in this open position until said last-named member is reengaged by said flywheel during the return movement of the latter.

9. In a shutter for a photographic device, means providing an exposure aperture, means including a plurality of movable blades for covering said aperture, resilient means normally biasing said blades into their aperture-covering position, a timing flywheel, means for mounting said flywheel for rotation, means normally holding said flywheel in a stationary position, means for applying a sharp impulse to said flywheel to free the same of said holding means and to impart rotary motion thereto, reversing means for reversing the direction of rotation of said flywheel, said reversing means including a rebound member and a mechanism for positioning said rebound member in the path of movement of said flywheel to cause said member to engage said flywheel, the engaging parts of said rebound member and said flywheel being so constituted as to effect the reversal of motion of said flywheel without any substantial diminution in the energy content of said flywheel, said rebound member and said impulse-applying means engaging said flywheel for only a small portion of the total travel thereof, said holding means reengaging and holding said flywheel upon the return thereof to its normally stationary position, and means for connecting said flywheel to said blades so that said flywheel, during rotation from its initial stationary position, moves said blades out of their aperture-covering position, said connecting means being so constituted that said blades return to their aperture-covering position when said flywheel returns to its initial stationary position, said connecting means comprising a cam for engaging and moving said blades, a member mounting said cam for rotary movement about an axis substantially concentric with the axis of rotation of said flywheel, means for detachably securing said last-named member to said flywheel and means for effecting the detachment of said last-named member and said flywheel when said blades have been moved by said cam to their fully open position, said cam and said blades cooperating with one another in said last-named position to hold said blades stationary against the bias of said resilient means until said last-named member is reengaged by said flywheel during the return movement of the latter.

10. In a shutter for a photographic device, means providing an exposure aperture, means including a plurality of movable blades for covering said aperture, resilient means normally biasing said blades into their aperture-covering position, a timing flywheel, means for mounting said flywheel for rotation, means normally holding said flywheel in a stationary position, means for applying a sharp impulse to said flywheel to free the same of said holding means and to impart rotary motion thereto, reversing means for reversing the direction of rotation of said flywheel, said reversing means including a rebound member and a mechanism for positioning said rebound member in the path of movement of said flywheel to cause said member to engage said flywheel, the engaging parts of said rebound member and said flywheel being so constituted as to effect the reversal of motion of said flywheel without any substantial diminution in the energy content of said flywheel, said rebound member and said impulse-applying means engaging said flywheel for only a small portion of the total travel thereof, said holding means reengaging and holding said flywheel upon the return thereof to its normally stationary position, and means for connecting said flywheel to said blades so that said flywheel, during rotation from its initial stationary position, moves said blades out of their aperture-covering position, said connecting means being so constituted that said blades return to their aperture-covering position when said flywheel returns to its initial stationary position, said connecting means comprising a cam for engaging and moving said blades, a member mounting said cam for rotary movement about an axis substantially concentric with the axis of rotation of said flywheel, means for detachably securing said last-named member to said flywheel and means for effecting the detachment of said last-named member and said flywheel when said blades have been moved by said cam to their fully open position, said cam and said blades cooperating with one another in said last-named position to hold said blades stationary against the bias of said resilient means until said last-named member is reengaged by said flywheel during the return movement of the latter, said cam being elongated and the ends of said cam being adapted to engage indentations in said blades to hold the latter stationary in said fully open position.

MURRY N. FAIRBANK.

References Cited in the file of this patent

UNITED STATES PATENTS

| Number | Name | Date |
|---|---|---|
| 438,944 | Perry | Oct. 21, 1890 |
| 477,012 | Kords | June 14, 1892 |
| 2,531,936 | Fairbank | Nov. 28, 1951 |